United States Patent [19]
Tian

[11] Patent Number: 6,011,543
[45] Date of Patent: Jan. 4, 2000

[54] MULTI-DIMENSION COMPUTER MOUSE

[75] Inventor: Tom Tian, Taipei, Taiwan

[73] Assignee: Behavior Tech Computer Corporation, Taipei, Taiwan

[21] Appl. No.: 09/316,045

[22] Filed: May 21, 1999

[51] Int. Cl.$^7$ .................................................. G09G 5/08
[52] U.S. Cl. ............................................ 345/163; 345/157
[58] Field of Search .................................. 345/156, 157, 345/163, 164, 169

[56] References Cited

U.S. PATENT DOCUMENTS

| | | | |
|---|---|---|---|
| 5,157,381 | 10/1992 | Cheng | 345/163 |
| 5,298,919 | 3/1994 | Chang | 345/163 |
| 5,446,481 | 8/1995 | Gillick et al. | 345/163 |
| 5,563,631 | 10/1996 | Masunaga | 345/169 |
| 5,771,038 | 6/1998 | Wang | 345/163 |

*Primary Examiner*—Bipin Shalwala
*Assistant Examiner*—Kent Chang
*Attorney, Agent, or Firm*—Rosenberg, Klein & Lee

[57] ABSTRACT

A multi-dimensional computer mouse includes a casing in which a circuit board is mounted. Left and right buttons are provided on a top of the casing for functioning as regular mouse push buttons. A third push button is arranged between the left and right buttons. A post extends from the third button to the circuit board. A spherical expansion is formed on a lower end of the post and rotatably received in a socket fixed on the circuit board for forming a joint allowing the post to be rotated from a neutral position to front and rear actuation positions wherein a collar of the post contacts and triggers a front contact switch and a rear contact switch. The post is floatingly supported by a spring arranged between the socket and the collar thereby allowing the post to be depressed against the spring for having the lower end of the post contact and trigger a bottom contact switch. Thus, a user is allowed to selectively trigger either one of the three contact switches for controlling a monitor cursor of a computer to which the mouse is coupled.

7 Claims, 3 Drawing Sheets

MULTI-DIMENSION COMPUTER MOUSE

FIELD OF THE INVENTION

The present invention generally relates to a computer mouse, and in particular to a computer mouse capable to operate in a three-dimensional fashion.

BACKGROUND OF THE INVENTION

A computer mouse provides a man-machine interface between a computer and a user. Conventionally, a computer mouse controls and moves a cursor in a two-dimensional space defined on a computer display. In other words, the cursor is controlled by the mouser to move in X- and Y-dimension. This suits most computer applications. However, there are cases that require the cursor to move in a third dimension, such as Z-dimension or to control another parameter rather than X- and Y-displacement, such as moving speed of article or magnitude of a force applied to an article in a computer game or width of lines in a computer drawing application.

In order to provide the third-dimensional control of a computer mouse, a joystick is added to the computer mouse. The Joystick is movable by a user of the mouse in a forward-backward direction representing increase and decrease of the parameter associated with and defined by the third dimension. Due to limitation imposed on by physical size of a computer mouse, the joystick has to be short. This kind of short joystick is difficult to operate. Sometimes, undesired movement of the mouse may be induced due to the operation of the joystick.

It is thus desired to have a multi-dimensional computer mouse which allows an efficient control of a third dimension of a computer application.

SUMMARY OF THE INVENTION

Accordingly, an object of the present invention is to provide a multi-dimensional computer mouse which allows an efficient control of a third dimension of a computer application.

Another object of the present invention is to provide a multi-dimensional computer mouse having a simple structure.

To achieve the above objects, in accordance with the present invention, there is provided a multi-dimensional computer mouse comprising a casing in which a circuit board is mounted. Left and right buttons are provided on a top of the casing for functioning as regular mouse push buttons. A third push button is arranged between the left and right buttons A post extends from the third button to the circuit board. A spherical expansion is formed on a lower end of the post and rotatably received in a socket fixed on the circuit board for forming a joint allowing the post to be rotated from a neutral position to front and rear actuation positions wherein a collar of the post contacts and triggers a front contact switch and a rear contact switch. The post is floatingly supported by a spring arranged between the socket and the collar thereby allowing the post to be depressed against the spring for having the lower end of the post contact and trigger a bottom contact switch. Thus, a user is allowed to selectively trigger either one of the three contact switches for controlling a monitor cursor of a computer to which the mouse is coupled.

BRIEF DESCRIPTION OF THE DRAWINGS

The present invention will be apparent to those skilled in the art by reading the following description of a preferred embodiment thereof, with reference to the accompanying drawings, in which.

DETAILED DESCRIPTION OF THE PREFERRED EMBODIMENT

Figure 1:
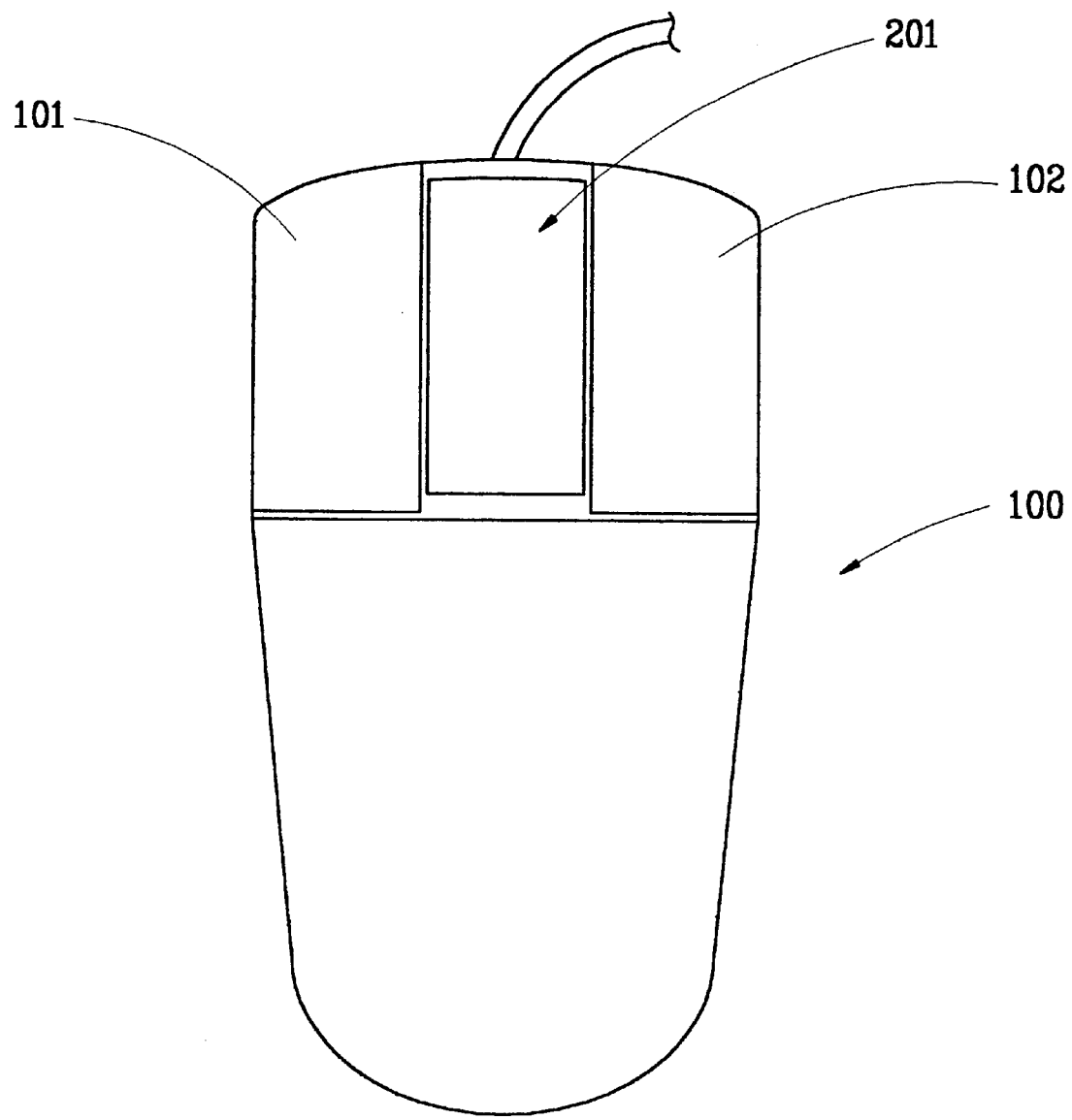
FIG. 1 is a top view of a multi-dimensional computer mouse constructed in accordance with the present invention.

With reference to the drawings and in particular to FIG. 1, a multi-dimensional computer mouse constructed in accordance with the present invention, generally designated by reference numeral 100, is shown, the computer mouse 100 comprises a casing (not labeled) with a left button 101 and a right button 102 mounted on a top side thereof. The left and right buttons 101, 102 have the same functions of their counterparts of a regular computer mouse and no further discussion will be given herein. A third dimension control means 200 comprises a push button 201 is arranged in the casing with the push button 201 positioned on the top side of the mouse casing between the left and right buttons 101, 102.

Figure 2:
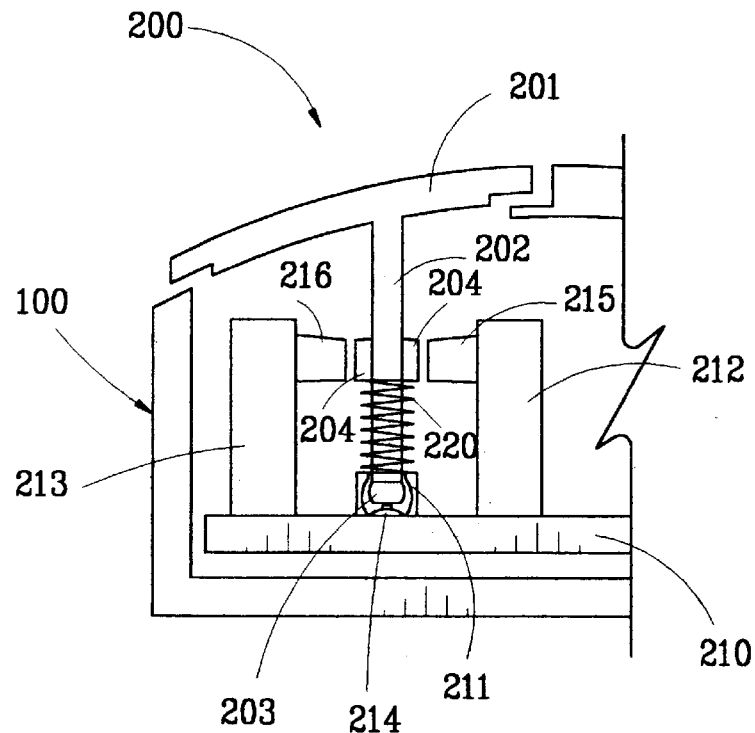
FIG. 2 is a partial cross-sectional view of the multi-dimensional computer mouse at a neutral position.

Further referring to FIG. 2, the third dimension control means 200 comprises a post 202 extending from the push button 201 toward a circuit board 210 mounted on a bottom of the mouse casing. A joint is formed between a lower end of the post 202 and the circuit board 210 comprising a spherical expansion 203 formed on the lower end of the post 202 and a socket 211 fixed on the circuit board 210 for rotatably receiving the end expansion 203 of the post 202 thereby allowing the post 202 and the push button 201 to be moved in a forward-rearward direction.

Figure 3:
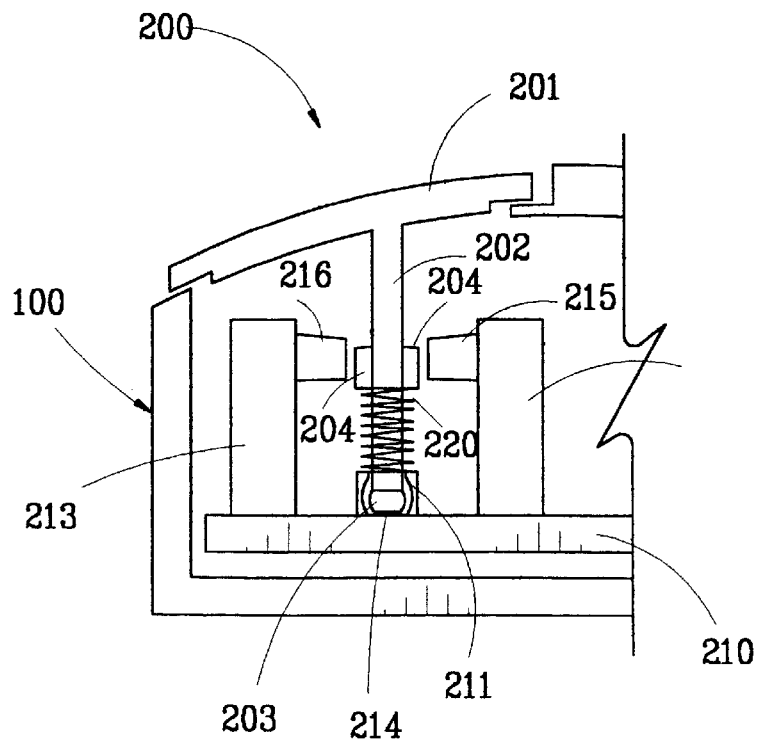
FIG. 3 is a partial cross-sectional view of the multi-dimensional computer mouse at a bottom actuation position.

A biasing element, such as a compression spring 220, is arranged between the circuit board 210 and the post 202 for biasing the post 202 and the push button 201 to a neutral position as shown in FIG. 2. Preferably, a ring member or collar 204 is fixed to the post 202 and the spring 220 is arranged between the ring member 204 and the socket 211 for floatingly supporting the post 202 at the neutral position. The biasing element 220 allows the push button 201 to be depressed thereby causing the post 202 to move to a bottom actuation position (FIG. 3). A first contact switch 214 is arranged in the socket 211 and in electrical connection with the circuit board 210. The first contact switch 214 is contacted and triggered by the expanded end 203 of the post 202 when the post 202 is depressed and moved to the bottom actuation position.

Figure 4:
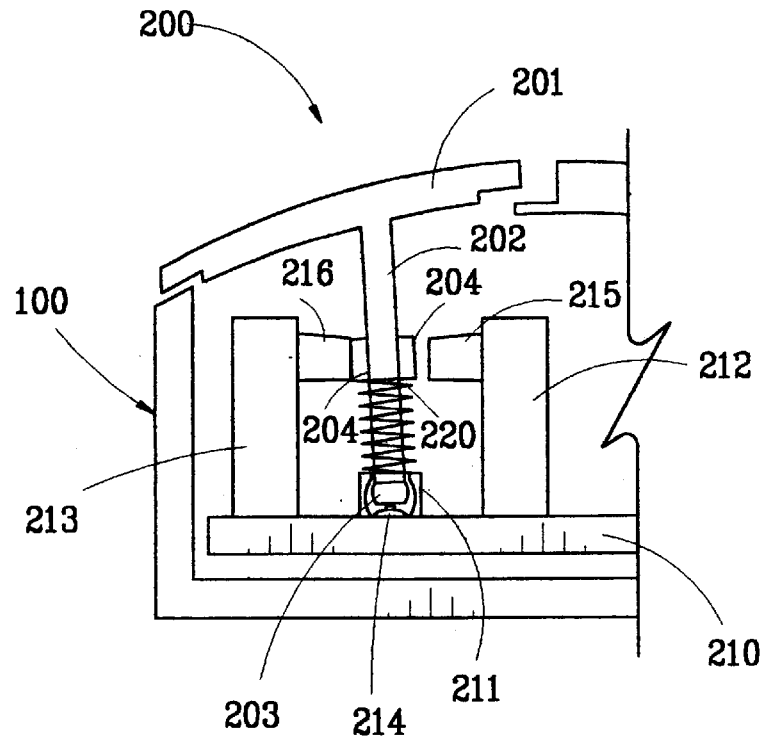
FIG. 4 is a partial cross-sectional view of the multi-dimensional computer mouse at a front actuation position.
Figure 5:
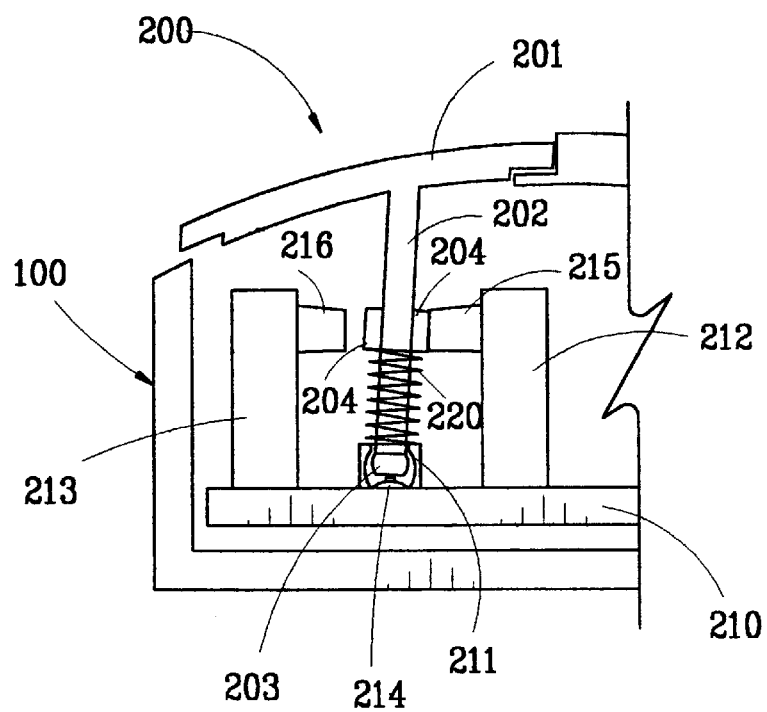
FIG. 5 is a partial cross-sectional view of the multi-dimensional computer mouse at a rear actuation position.

Rear and front support bars 212, 213 are fixed on the circuit board 210 on which second and third contact switches 215, 216 are mounted and electrically connected to the circuit board 210. As mentioned above, the joint between the expanded end 203 of the post 202 and the socket 211 allows the push button 201 and the post 202 to move in the forward-rearward direction. The forward movement of the post 202 causes the ring 204 fixed to the post 202 to contact and trigger the third contact switch 216 (FIG. 4), while the rearward movement of the post 202 causes the ring 204 to contact and trigger the second contact switch 215 (FIG. 5).

If desired, biasing means (not shown) may be provided between the post 202 and the support bars 212, 213 for maintaining the post 202 at the neutral position.

Thus, the push button 201 allows a user to selectively trigger either the first contact switch 214, the second contact switch 215 or the third contact switch 216. In an application of the multi-dimensional computer mouse 100, the second and third contact switches 215, 216 may be designated for increasing and decreasing a parameter defined by the third dimension, such as increasing/decreasing force, accelerating/decelerating and moving upward/downward, while the first contact switch 214 may be used as a pick-up switch or a setting switch. The fiction of these contact switches 214, 215, 216 may be different, if desired, and may be controlled and determined by computer application software. This is apparent to those skilled in the art and no further detail is needed herein.

Although the present invention has been described with respect to a preferred embodiment, it is contemplated that a variety of modifications, variations and substitutions may be done without departing from the scope of the present invention that is intended to be defined by the appended claims.

What is claimed is:

1. A multi-dimensional computer mouse comprising:
   a casing having a top and a bottom defining an interior space therebetween for receiving a circuit board positioned on the bottom;
   first and second buttons mounted on the top of the casing and in electrical connection with the circuit board; and
   a third dimension control means incorporated in the casing for controlling a third dimension, the third dimension control means comprising:
      a push button movably mounted on the top of the casing;
      a post extending from the push button toward the circuit board, the post having an expanded lower end received in a socket fixed on the circuit board, the lower end being axially movable and rotatable with respect to the socket thereby allowing the lower end of the post to be movable between a neutral position and a bottom actuation position and allowing the post to be rotatable with respect to the socket between a front actuation position and a rear actuation position;
      a first contact switch arranged in the socket and in electrical connection with the circuit board whereby the first contact switch is contacted and triggered by the expanded end of the post when the post is moved to the bottom actuation position; and
      second and third contact switches fixed on and in electrical connection with the circuit board whereby the second and third contact switches are selectively contacted and triggered when the post is moved to the front actuation position and the rear actuation position.

2. The multi-dimensional computer mouse as claimed in claim 1, wherein biasing means is provided to maintain the post at the neutral position.

3. The multi-dimensional computer mouse as claimed in claim 2, wherein the biasing means comprises a biasing element arranged between the circuit board and the post.

4. The multi-dimensional computer mouse as claimed in claim 3, wherein the biasing element comprises a spring arranged between the post and the socket.

5. The multi-dimensional computer mouse as claimed in claim 4, wherein a ring member is fixed to post, the spring being arranged between the ring and the socket.

6. The multi-dimensional computer mouse as claimed in claim 1, wherein two support bars are mounted to and extend from the circuit board for supporting the second and third contact switches.

7. The multi-dimensional computer mouse as claimed in claim 1, wherein a ring member is fixed to the post for engaging with the second and third contact switches when the post is moved to the front and rear actuation positions.

* * * * *